Feb. 13, 1923. Re. 15,537

J. A. WHERRY

TYPEWRITER

Original Filed Nov. 4, 1919 5 sheets-sheet 1

Inventor

John A Wherry by B B Stickney

Attorney

Feb. 13, 1923. Re. 15,537

J. A. WHERRY

TYPEWRITER

Original Filed Nov. 4, 1919 5 sheets-sheet 2

Inventor

John A Wherry by B C Stickney

Attorney

Feb. 13, 1923. Re. 15,537

J. A. WHERRY

TYPEWRITER

Original Filed Nov. 4, 1919 5 sheets-sheet 3

Inventor
John A Wherry
by D B Stickney
Attorney

Feb. 13, 1923. Re. 15,537

J. A. WHERRY

TYPEWRITER

Original Filed Nov. 4, 1919 5 sheets-sheet 4

Inventor

John A Wherry by D. B. Tickney

Attorney

Feb. 13, 1923. Re. 15,537

J. A. WHERRY

TYPEWRITER

Original Filed Nov. 4, 1919 5 sheets-sheet 5

Inventor
John A Wherry
by B. B. Stickney
Attorney

Reissued Feb. 13, 1923. Re. 15,537

UNITED STATES PATENT OFFICE.

JOHN A. WHERRY, OF NEW ORLEANS, LOUISIANA, ASSIGNOR TO UNDERWOOD TYPEWRITER COMPANY, OF NEW YORK, N. Y., A CORPORATION OF DELAWARE.

TYPEWRITER.

Original No. 1,320,593, dated November 4, 1919, Serial No. 274,199, filed January 31, 1919. Application for reissue filed April 29, 1921. Serial No. 465,556.

*To all whom it may concern:*

Be it known that I, JOHN A. WHERRY, a citizen of the United States, residing at New Orleans, in the parish of Orleans, in the State of Louisiana, have invented certain new and useful Improvements in Typewriters; and I do hereby declare the following to be a full, clear, and exact description of the invention, such as will enable others skilled in the art to which it appertains to make and use the same.

The present invention, as to certain features thereof, relates particularly to typewriting machines, in which a rotary platen occupies a printing position just in the rear of printing instrumentalities including a type-guide and ribbon-vibrator, and in which (to avoid the difficulty of inserting sheets, bottom-end first, downwardly in front of the platen, and of collating the same on the platen, with the latter thus directly behind the printing instrumentalities), the platen, preferably with a collating board, is translatable from the normal or typing position, forwardly over the printing instrumentalities to a position where interference from the type-guide and ribbon is avoided, and where other functions, such, for instance, as sheet-collating, inserting and arranging, may hence be more conveniently effected; the platen being presented to the operator in conveniently accessible position for collating and introducing the sheets bottom-end first around the platen, without liability of fouling upon the type-guide and ribbon-vibrator. A machine of this general character is shown in my Patent No. 1,351,081, dated August 31, 1920.

An object of the invention is the provision, in a machine in which a collating board is translatable with the platen, as aforesaid, of means whereby the board is brought to the collating station in a position in which its sheet-holding surface is substantially at right angles to the line of vision of the operator as the latter remains seated; and in which such surface may be somewhat inclined rearward from the bottom, better to support the sheets; and of clamps movable to and from the board whereby several sheets, one at a time, and as the collating operation progresses, may be secured in adjusted position over each other on the upright or inclined board.

A further object of the present invention is the provision of means movable as a unit with the platen, between the typing and the sheet-collating or inserting stations, and serving in both stations to define the printing line on the platen and the letter-space positions therealong; whereby, at the sheet-inserting station, the sheets may be arranged on the platen with direct reference to the printing line of the latter; that is to say, with the desired printing positions on the sheets or forms immediately at the printing line of the platen, or in correct line-space relation thereto, so that adjustment independently of the line-space mechanism of the machine is thereafter not necessary in order to commence printing at the desired line-positions on the sheets.

In the preferred form of the invention: for defining the printing line of the platen at the sheet-inserting station, the platen has, circumferentially arranged thereon, numbered demarcations, spaced line-feed measurements apart; so that the demarcation indicating the printing line in the printing station will also indicate that line in the sheet-inserting station: and, for defining the letter-space printing positions on the platen at the sheet-inserting station, there is a scale extending longitudinally thereof at or just below the printing line and carried with the platen from one to the other station. This scale may also serve as a line-gage to indicate the printing line at the sheet-inserting position. In connection with such scale or line-gage, a feature of the invention is the provision of means for moving the same sufficiently from the platen to permit of easy positioning of the sheets on the latter.

In a front-strike machine, such, for instance, as the Underwood, there is usually provided an apron or paper-guide which passes around the lower part of the platen to the front thereof, where it forms, with the platen, a mouth through which the typewritten sheets are ejected, top-end foremost; and, in the machine of my aforesaid Letters Patent, this apron or paper-guide is translated with the platen from the printing station, over and clear of the printing instrumentalities, to a station or position where the sheets may be conveniently inserted bottom-end first into this mouth defined by the apron and the platen, thence to be guided by the apron onto the face of the platen. In the Underwood machine, this apron carries pressure feed-rolls for holding the paper to the platen, and is movable to release the rolls when sheets are to be inserted, and to reapply the rolls when the sheets are positioned on the platen; and, in the machine of my aforesaid Letters Patent, this roll-releasing and reapplying function of the apron is had at the sheet-inserting station, so that, upon reapplication of the rolls, they will serve to hold the paper to the platen during the return of the platen to the printing station. In the present invention, the line-gage above mentioned is conveniently carried by the upper front edge of the apron so as to partake of the roll-releasing action of the latter to provide ample space for the insertion of sheets between the gage and the platen.

The invention, as to certain features thereof, relates particularly to collating boards or tables for typewriting machines: an object of the invention being the provision of means whereby work-sheets may be assembled or collated with ease and accuracy on such a board, and transferred to the platen without disarrangement. More particularly, the invention relates to a typewriting machine in which a collating board is combined with a platen translatable, as above described, between a printing and a collating station; whereby sheets collated on the board may be fed from the board, downward, bottom-end first, around the platen at the front of the machine, to printing position; the apron or paper-guide, previously referred to, being preferably present to form with the platen a mouth in line with the delivery end of the board to receive the sheets, bottom-end first, and to guide the same to position between the releasable feed-rolls and the platen.

In connection with the collating board, a further feature of the invention is the provision of a finger or clip (preferably resilient and carrying a roller), for engagement with the platen in the collating position, which finger or clip is itself carried by a marginal gage on the collating board, and is adjustable with said gage transversely or crosswise of the collating board; so that a work-sheet, having been set by the gage and adjusted with respect to the printing line of the platen, may be held to the platen by said finger or clip while the usual feed-rolls are released from the platen to permit other sheets to be adjusted on the platen with respect to the work-sheet so held by the clip; after which the feed-rolls may be re-applied to the platen to hold all of the adjusted sheets.

A further feature of the invention is the provision of sheet-holding clamps or clips at the collating board, which are so shaped and operated that they may lie between the sheets when holding the same, but may be released therefrom without, as heretofore, being swung up or lifted out of the collated body of sheets, and without involving the objectionable bending up and frequent tearing of the sheet edges involved in such former swinging and lifting movements. In the preferred embodiment of this feature of the invention, the clamps are of thin, flat sheet-metal, so that, although they interpose between the edges of the sheets, parallel to the board, the sheet edges lie substantially flat, one over the other; and the releasing movement of the clamps is a lifting of the same just sufficient to relieve the pressure thereof on the sheets, while maintaining the clamps in their parallel relation to the board and sheets. Preferably, the clamps are positioned, one or more, on each side of the board, edge gages being used as integral parts of the clamp-supports.

An object of the invention is the provision, in connection with the collating board, of sheet-holding clamps, separately settable, and simultaneously releasable; whereby, with all clamps released, a proof-sheet, or other first sheet, may be inserted under all of the clamps which project into its field; one of these clamps then depressed or set to hold that sheet; another sheet then laid flat over the first sheet and the depressed clamp, but under the remaining, released, clamps; and another clamp then depressed to hold the second sheet, etc.: the clamps being thus successively brought into play, and remaining effective until the collation is complete and the feed-rolls have been applied to hold the sheets in their collated position to the platen; whereupon the clamps are all releasable to permit carbon-sheets to be interleaved with the work-sheets, and all the sheets thereupon withdrawn lengthwise as a unit from the interleaving clamps.

Other features and advantages will hereinafter appear.

In the accompanying drawings,

Figure 1 is a front elevation of an embodiment of my device, showing the same in place on a portion of a typewriter-frame.

Figure 1[a] is a diagram to show the platen floated forward over the type-guide and ribbon-vibrator to full-line collating position; the printing point on the platen being indicated by the arrow.

Figure 6 is a fragmental perspective view of one form of the sheet-alining strip.

Figure 1:
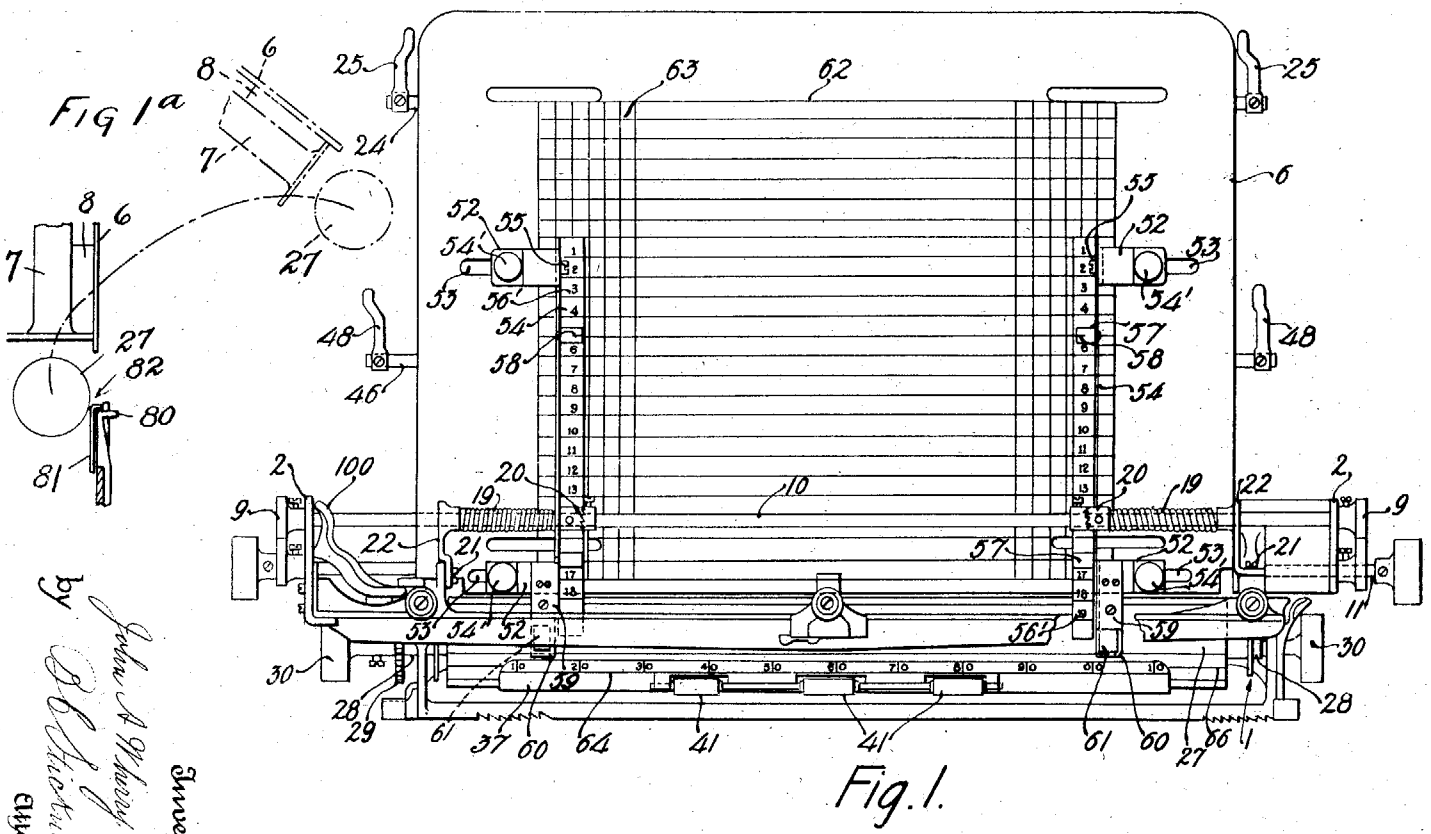
Figure 2:
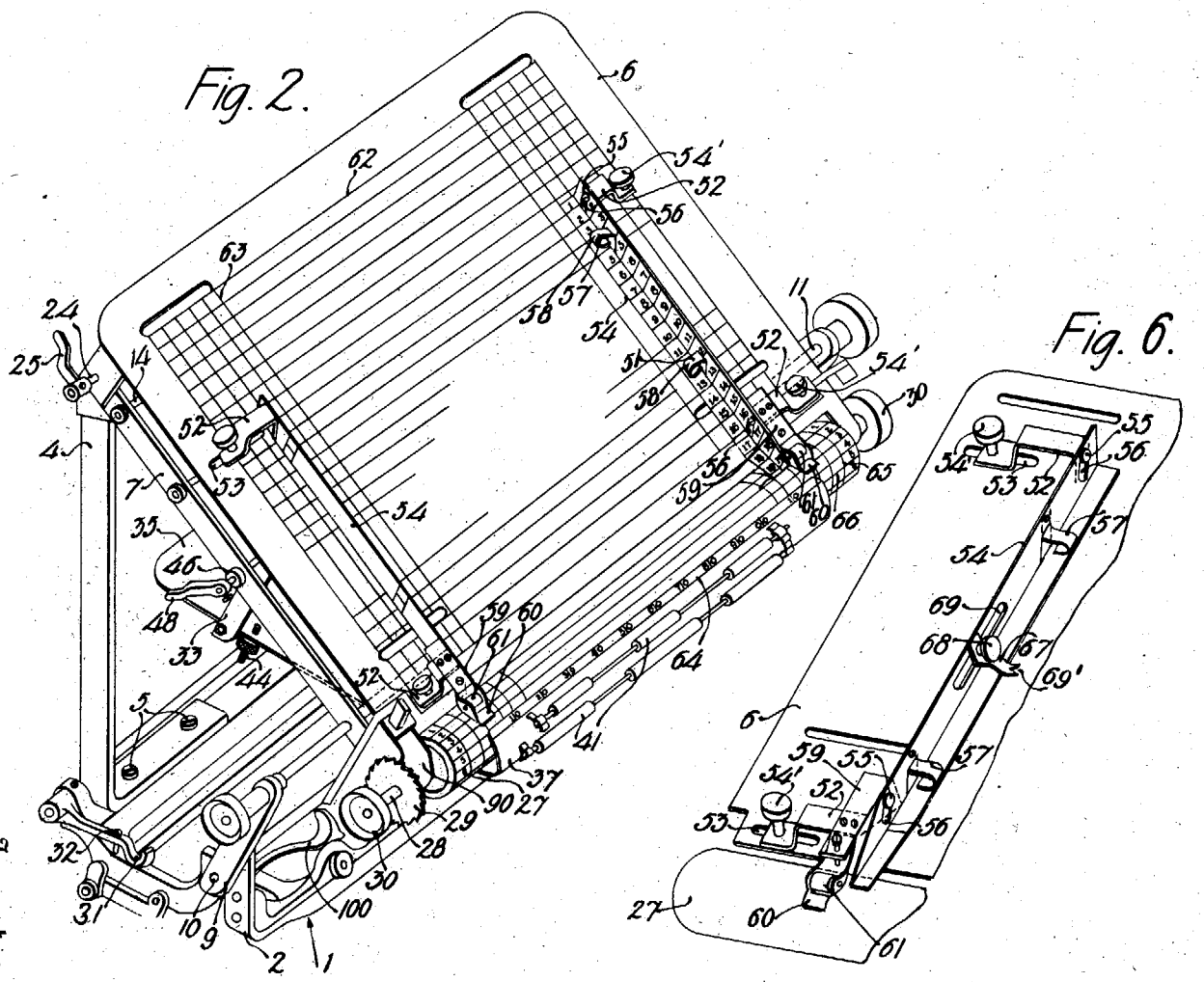
Figure 2 is a perspective view of the device.
Figure 4:
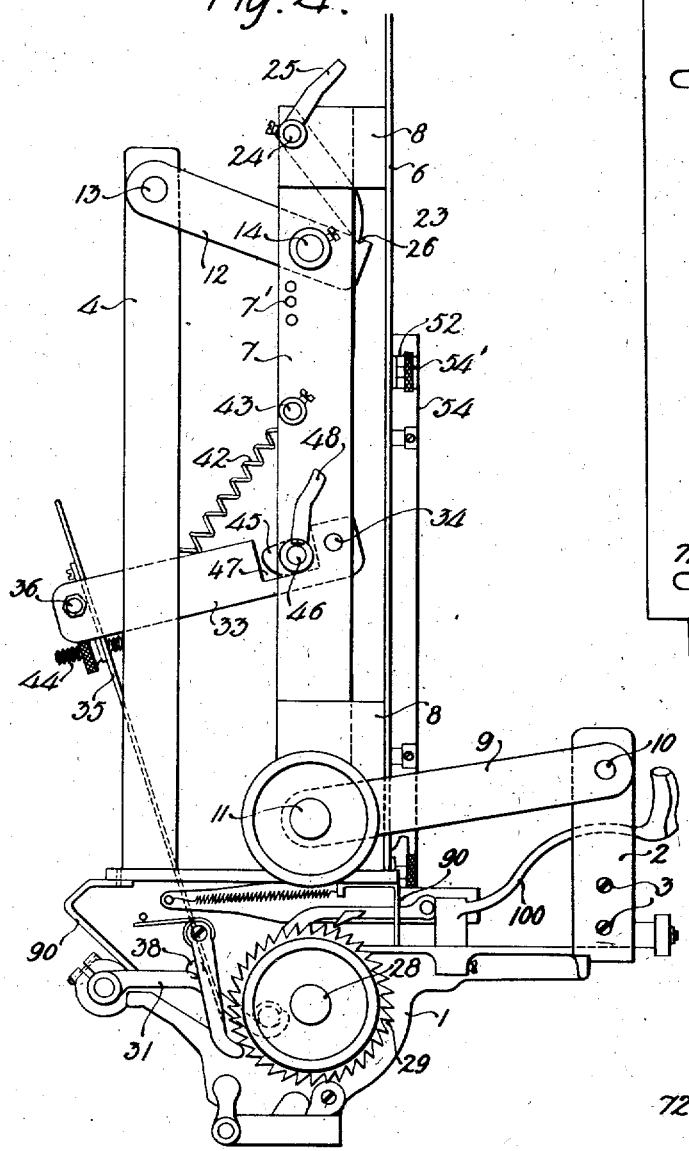
Figure 4 is a side elevation.
Figure 5:
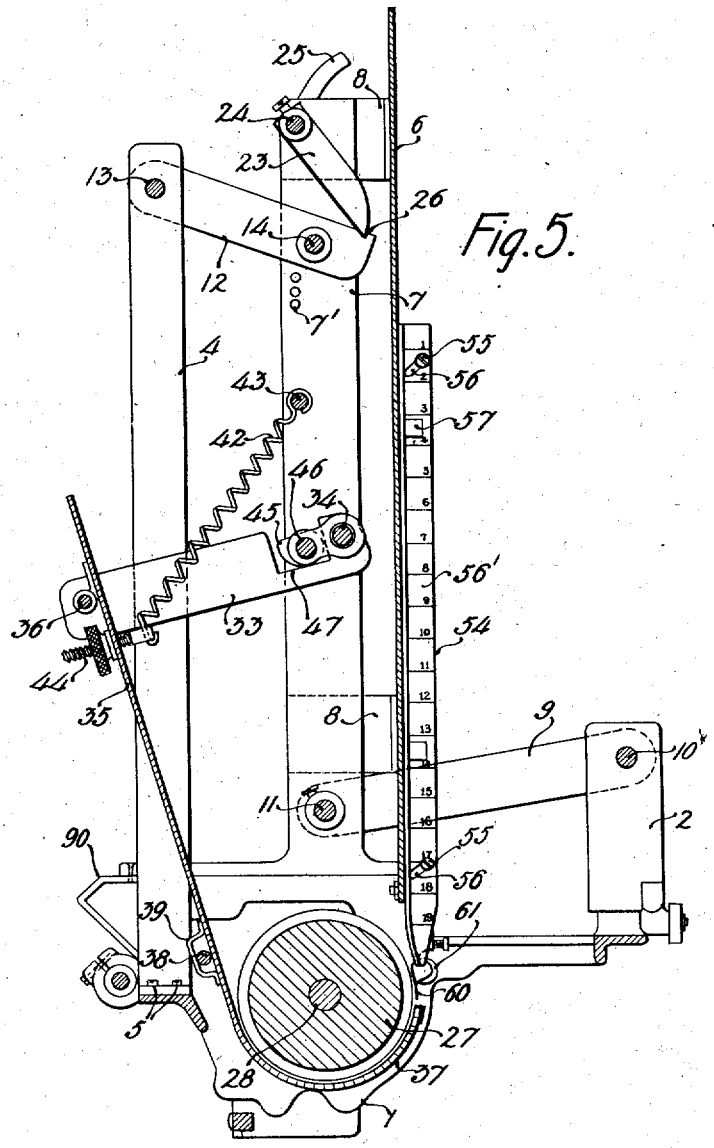
Figure 5 is a vertical sectional view.

The invention is shown as applied to a front-strike typewriter having a rotary platen 27 supported in a carriage 1. The printing instrumentalities of the typewriter usually include type-bars (not shown) and a type-guide 80, Figure 1[a], as well as a ribbon-vibrator 81, both of these being so close to the platen 27 as to interfere with the insertion of work-sheets down around the front of the platen. This difficulty is overcome by floating the platen from full-line printing position at Figure 1[a] forwardly over the printing instrumentalities 80, 81, as well as over the inking-ribbon (not shown) to the dotted-line sheet-collating position, the printing line on the platen being always in the line of vision or foremost, as indicated by the arrow at 82. This floating movement is effected as follows:

Mounted on the forward part of the carriage-frame 1 are a pair of upwardly-extending standards 2, which are secured to the frame by suitable fasteners 3. At the rear of the carriage-frame a pair of relatively longer standards 4 are located, which standards are secured to the carriage-frame by suitable fasteners 5. The collating board 6 is attached by brackets 8 to a frame which includes side bars 7; and the bars 7 are fast to the platen-frame 90. A pair of links 9 are pivoted at 10 to standards 2, on the front of the carriage, and extend to, and are pivotally attached to, a rod 11 which extends between, and is carried by, the side bars 7 of the collating-board frame. The rod 11 serves as an axis on which the forward part of the combined platen and collating-board frame may swing on the arms 9 around 10, as an axis, on the fore part of the typewriter-carriage. From the upper ends of the rear standards 4, links 12 extend. These links are fast at one end to a rod 13 which turns in the standards 4, and at the other end are pivoted to a rod 14, which extends between the side bars 7. The rod 14 serves as an axis on which the upper part of the combined platen and collating-table frame may turn when the arms 12 are swung around 13, as an axis, on the typewriter-carriage. With this arrangement of links, the collating board may be swung into a vertical position, such as illustrated in Figures 4 and 5, for instance; or, on the other hand, it may be raised and swung into an inclined position, such as illustrated in Figure 2; the links 9 and 12 moving pivotally during the swinging of the board from one of said positions to the other. As the lower part of the frame is swung upward and forward on the links 9, from Figure 4 to Figure 2 position, it will be noted that the upper part of the frame is swung upward and backward on the links 12; the links 12 acting to cause the frame to be tilted or folded back during this operation in such manner that the platen is so turned on the rod 11, as an axis, as to maintain its printing line at the front thereof, and automatically present its printing line at the front thereof when the parts come to rest in sheet-arranging position. At the same time the folding back of the collating table brings the latter into such angular position as to permit of placement of sheets thereon when in the sheet-arranging position. The movement of the links 12, and, consequently, of the collating board and platen, may be limited by the insertion of a pin in any of the series of holes 7′ in the side bar 7 of the frame.

A pair of helical springs 15 surround the rod 13, and each of these springs is attached at one of its ends to the adjacent standards 4 by a suitable arm 16. At the other end, the spring 15 is attached to a clutch-member 17 which is adapted to co-operate with a similar clutch-member 18, fast to the rod 13, so that the tension of the spring, to turn the rod 13, and swing up the arms 12, may be varied at the will of the operator. A similar pair of springs 19 are mounted on the rod 10. These springs 19 are provided with adjustable clutches 20 similar to those already described, securing the same to rotatable rod 10, and are attached at 21 through arms 22 to the carriage-frame, so as to tend to turn the rod 10 and swing up the arms 9 which are fast thereto. These springs 15 and 19 therefore tend to raise the collating board so as to move the same from the position shown in Figure 5 to the position in Figure 2, or at least to assist in such movement. The degree of assistance is, of course, determined by the tension which is placed upon the springs through the adjustment of the clutches associated therewith. The effect of the springs is normally overcome and the collating board maintained in its vertical position by a latch-member 23, which is pivoted on a rod 24 extending between the side bars 7 of the frame. This rod 24 is provided at its ends with operating handles 25 and the latch-member 23 is normally maintained in engagement with a notch 26 in the adjacent link 12 by a spring 27′ which encircles the rod 24, is attached thereto and is at its other end attached to the rod 14. Upon the disengagement of the latch-member 23 from the notch 26, however, the springs 15 and 19, by urging upward the links 9 and 12, relieve the operator of considerable of the weight of the parts to be swung, and thus co-operate in rendering the movement to sheet-arranging position an easy movement.

The collating-board frame, as stated, is supported on the usual inner carriage or platen frame ends 90. The platen 27 is rotatably supported on the usual shaft 28 that extends through the inner carriage ends. The ends of shaft 28 support the actuating ratchet 29 and the operating knobs 30. The attachment of the collating board to the inner carriage ends is such that the inner carriage and platen of the typewriting machine will be swung simultaneously with the collating board. When the collating board is swung into its vertical position, the inner carriage, platen and actuating mechanism will asume operative relation with the typewriter-carriage, and the extended lugs on inner carriage ends will rest within the inner carriage lift hooks 31 which are made stationary with the carriage-frame by suitable fasteners 32.

Figure 3:
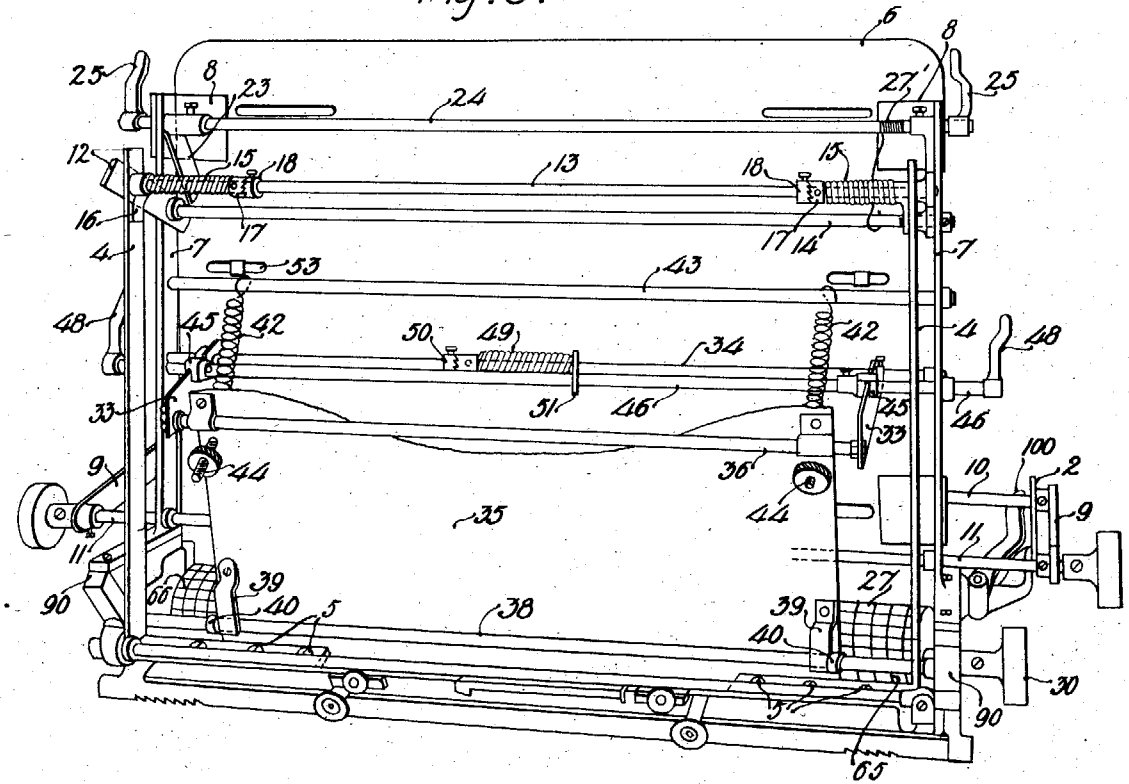
Figure 3 is a rear elevation thereof.

A pair of arms 33 are pivoted at 34 to the side bars 7 of the collating-board frame and extend rearwardly therefrom. A sheet-shelf 35 is pivotally supported at 36 on these arms and extends downwardly and around the platen as at 37. The lower end of this sheet-shelf 35 is supported by a rod 38, which extends through keepers 39 on the shelf, the keepers being elongated so as to permit the movement of the shelf to and away from the platen. Lateral movement of this shelf on the rod 38 is prevented by collars 40, which are secured to the rod 38. This sheet-shelf 35 is provided with a series of feed-rollers 41 similar to those described and illustrated in my patent above referred to, and the rollers are held normally in contact with the face of the platen by resilient means 42, which in one phase take the form illustrated in Figure 5. These springs 42 are secured to rod 43 near side bars 7 and to the sheet-shelf 35 by adjustable screws 44, the screws being provided so that the tension of the springs may be varied at the will of the operator. However, the effect of these springs 42 may be overcome and the sheet-shelf moved away from the platen to permit the insertion of the sheet therebetween by means of cams 45, which are mounted on a rod 46, the rod extending between and being pivotally mounted in the side bars 7. These cams 45 operate in the notches 47 in the arms 33, and are actuated by means of handles 48 located at the sides of the collating board and secured to the rod 46. When the handles are turned downwardly the cams 45 are actuated so as to depress the arms 33 and consequently move the sheet-shelf away from the platen against the tension of the springs 42. In another phase, the resilient means takes the form illustrated in Figure 3, wherein a spring 49 encircles the rod 34, is secured thereto by a suitable clutch 50, which is provided to vary the tension of the spring and is associated with the rod 46 through the medium of a yoke 51. When this form of resilient means is used the springs 42 may be dispensed with, but it is to be understood that the spring 49 may be used in conjunction with the springs 42.

A plurality of brackets 52 are mounted on the collating board and are adjustable transversely thereof in slots 53, the brackets being held in their adjusted positions by suitable thumb-screws 54′. Sheet-alining strips or side gages 54 are mounted loosely on these brackets 52 by means of screws 55, which extend through diagonally-arranged slots 56 in the vertical webs of the angular gages. These sheet-alining strips or gages 54 are thus free to move to and away from the collating board 6 in an acute angular direction, the movement being toward and from the platen, and they are held normally in contact with the surface of the collating board by their weight. Furthermore, they are provided with scales indicated generally by the reference character 56′ which assist in the positioning of the sheets and are also provided with resilient clips 57 for the purpose of holding the ledger and statement sheets in place during the arrangement of the same on the board. Each of these clips is provided with a mark 58 which coincides with a corresponding mark on the sheet-alining strips or gages. The lowermost of the brackets 52 are each provided with an extending arm 59, which terminates in a finger 60, and is provided with a roller 61. The finger and roller extend over the platen and the roller normally bears against the same, being held in such position by the resiliency of the arm 59. The rollers 61, as hereinafter stated, grip the proof-sheet or other first sheet against the platen to hold it in adjusted position with respect to the platen, when the feed-rollers 41 are released from the platen to permit other sheets to be inserted between the same and the platen in adjusted position with respect to the work-sheet then held by the rollers 61.

Furthermore, the board itself is provided with transversely-extending lines 62 and lines 63 which extend perpendicular to the lines 62. The lines 62 coincide with the graduations on the gages 54. Extending parallel to the axis of the platen 27 is a scale 64 on which the designations indicate the printing positions of the typewriting machine and the platen itself is provided with circumferential lines 65, as well as with lines 66, which are arranged parallel to its axis, which will assist in determining the proper positions of the sheets to be collated. The scale or gage 64 permits of collation or arrangement of the sheets with direct reference to the printing line of the typewriter.

In another form of the invention, such as illustrated in Figure 6 of the drawings, I provide, in addition to the clips 57, clips 67 which are secured to the vertical webs of the gages 54 by thumb-screws 68, which screws are adjustable in longitudinally-extending slots 69. The clips 67 are provided with notches 69′, which are adapted to coincide with the corresponding lines on the gages.

The lines 66 on the platen are numbered as in Figure 2, at line-space measurements apart, so that whatever line 66 denotes the printing line at the printing station may, at the collating station, be used as the line with reference to which the collation is made. The lines 62 are also at line-space measurements apart, and are positioned at line-space measurements with respect to the printing line on the platen; so that line-positions on collations, made with reference to the lines 62, may be brought to the printing line by mere line-feed of the platen under control of the line-space mechanism. The lines 63 on the board are at letter-space multiples apart, and register with corresponding divisions on the scale 64, in order that any sheet may be set laterally of the board in desired column or letter-space position. The marks 63, of course, serve as means for marginal adjustment of the several sheets when desired; and, in this connection, it will be noted that, when a sheet is set under the side gages 54, the latter will serve not only to hold such sheet, but, by reason of their lateral adjusting means 53—54′, may serve to hold other sheets in any desired laterally-offset position with respect to the under sheet. The clips 67 permit sheets to be held out at some distance from the side gages 54, and in marginal positions other than those determined by the gages 54 and clips 57; and the demarcations 69′ on the clips 67 serve to extend outward or laterally any selected demarcations 56′ on the gages 54, thus assuring accuracy in line-positioning of sheets held by the clips 67. The demarcations 58 on the clips 57 have a similar function.

Figure 7:
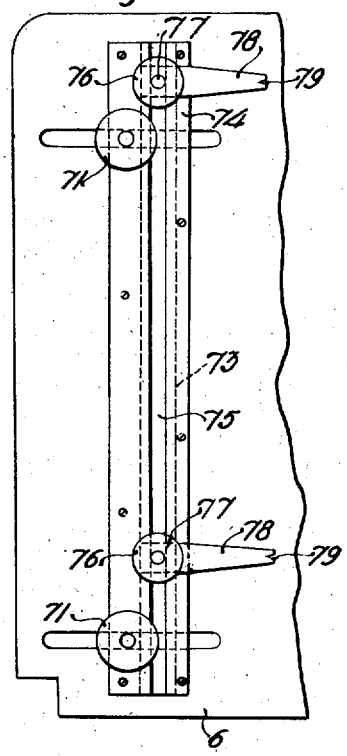
Figure 7 is an elevational view of a modified form of the alining strip.
Figure 8:
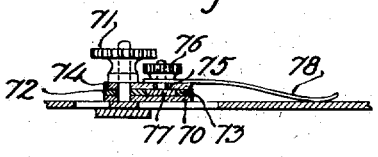
Figure 8 is a transverse sectional view of the device shown in Figure 7.

In the modified form of the invention, the sheet-alining strips or gages are somewhat modified. This modified form is disclosed in Figures 7 and 8, and includes parallel strips 70, which are adjustable to and away from each other, or transversely across the collating board, and are adapted to be held in their adjusted positions by thumb-screws 71. Second strips 72 are mounted on the outer faces of the strips 70 and are provided with slots 73 extending longitudinally thereof. Each of these strips 72 has superimposed thereon a scale 74 having graduations corresponding to the transverse lines 62 on the collating board, and each is provided with a slot 75. Thumb-screws 76, the shanks of which extend through slots 75, and the heads 77 of which are slidably mounted in the slots 73, carry resilient fingers 78 having notches 79 in their ends, the notches corresponding to the transverse lines 62 aforementioned. Thus, with this form of invention, the alining strips or gages may be moved to and away from each other and the resilient clips 78 may be adjusted longitudinally of the gages and thus will serve to hold the sheets which are being collated, in position on the collating board.

In operation, assuming that the parts are in the positions illustrated in Figures 4 and 5, the collating board is brought to a position where the sheets may be assembled by releasing the latch 23 when the collating board will, under the action of its actuating springs 15 and 19, and with or without the assistance of the operator, assume the position illustrated in Figure 2. At this time the platen will be disposed forwardly of the typewriter-carriage and the board will be in a convenient inclined position for the application of the sheets. In this position the printing line of the platen, as indicated by the line-gage or scale 64, is at the front of the platen in the direct line of vision. The handles 48 are actuated so as to depress the arms 33 and consequently move the sheet-shelf 35, with the feed-rolls 41, away from the platen. The gages 54 with the rollers 61 are then lifted to permit the proof-sheet, ledger-sheet or other first sheet to be inserted thereunder and adjusted in printing position by means of the scale 64, graduations 66 on the platen, and the graduated edges of the gages 54; whereupon, one or both gages 54 may be dropped to hold such adjusted sheet to the board, and to the platen by means of rollers 61. With the feed-rolls 41 still off the platen, and while one of the gages 54 and roller 61 holds the first sheet, the other gage 54 may be lifted, so that one edge of a second sheet, such as a ledger or statement sheet may be inserted and adjusted thereunder, with the other edge of the second sheet overlying that gage 54 which is then effective on the opposite edge of the first sheet. In positioning the second sheet, the same may be inserted back end first between the platen and the feed-rolls 41 which have not yet been re-applied to the platen. Other sheets may then be placed in adjusted position and held by the clips 57. When all the sheets have been positioned, the handles 48 are turned to apply the rolls 41, to hold all the sheets in their adjusted position to the platen. The gages 54 and clips 57 are then released to permit of insertion of carbons, and to permit of line-feed of the collated sheet.

After the sheets have thus been positioned, the collating board is again returned to its initial position, at which time the lugs on inner carriage ends will rest in the members 31 and the inner carriage, platen, and spacing mechanism will be in operative relation with the spacing lever 100 on the carriage. The work-sheets are then turned to the desired printing position on the typewriter, and the operator may thus proceed with the writing. The weight of the collating board will be distributed to the front and rear of the platen, that is to say, to the front and rear of the typewriter by the springs 15 and 19.

When the sheet-alining strips or gages 54 are dispensed with, the lowermost brackets 52 may be used to assist in alining the sheets on the collating board so that the proper printing position will be obtained.

It will be noted that in the drawings the embodiment of my invention illustrated is combined with an Underwood typewriter and that only slight modifications are necessary. For instance, in order to apply the device to an Underwood typewriter, it is only necessary to remove the upper shelf, feed-rollers and feed-roller-arms and to modify the inner carriage. The four supporting posts 2 and 4 are mounted on the outer carriage and the side bars 7 of the collating-board frame are fixed to the inner carriage ends. Of course, it is to be understood that the application of the device is not confined to an Underwood typewriter, as it may be applied to any typewriter with a rotary platen.

Variations may be resorted to within the scope of the invention, and portions of the improvements may be used without others.

Having thus described my invention, I claim:

1. The combination with a rotary platen, of a collating board associated therewith, angular sheet alining strips, and means carried by the board for supporting said strips to permit their movement to and away from the board.

2. The combination with a rotary platen, of a collating board associated therewith, angular sheet alining strips, and, means carried by the board for supporting said strips to permit their movement to and away from the board in acute angular relation to the board.

3. The combination with a rotary platen, of a collating board associated therewith, an angular sheet alining strip having slots therein, and supporting brackets on the board having studs extending through the slots in the strip.

4. The combination with a rotary platen, of a collating board associated therewith, an angular sheet alining strip having slots therein, and supporting brackets on the board having studs extending through the slots in the strip, said slots and board being arranged to converge toward the platen.

5. The combination with a collating board, of angular sheet alining strips mounted on the front thereof, and resilient clips mounted within the angles of the strips to secure the work-sheets thereto.

6. The combination with a collating board, of a rotary platen, feed-rollers arranged to bear on the front of the platen, and means on the board supporting the feed-rollers.

7. The combination with a collating board, of a rotary platen, feed-rollers arranged to bear on the platen, and adjustable means on the board for supporting the feed-rollers.

8. The combination with a collating board, of angular sheet alining strips mounted on the front thereof and movable to and away from the board, and means within the angles of the strips to secure the work-sheets thereto.

9. The combination with a collating board having a pair of brackets mounted thereon, of a rotary platen, feed-rollers arranged to bear on the platen, and means on the brackets for supporting the feed-rollers.

10. The combination with a collating board and a rotary platen, of means for supporting the board and platen for pivotal and bodily movements, means tending to produce an upward bodily movement of the board and platen, and means carried by the board for preventing such movement normally.

11. The combination with a typewriter, of a collating board, means located on opposite sides of the board for supporting the same on the typewriter, and means for relieving the weight of the board from the center of the carriage and for distributing the weight of the board to all of said supporting means.

12. The combination with a typewriter, of a collating board, posts on the typewriter located to the front and at the rear of the board, pivoted links extending from the front posts to the lower end of the board, pivoted links extending from the rear posts to the upper end of the board, and means tending to move the board pivotally.

13. The combination with a typewriter, of a collating board, posts on the typewriter located to the front and at the rear of the board, pivoted links extending from the front posts to the lower end of the board, pivoted links extending from the rear posts to the upper end of the board, means tending to move the board pivotally, and manually controlled means on the collating board for normally preventing such movement of the board.

14. The combination with a typewriter, of a collating board, posts on the typewriter located to the front and at the rear of the board, pivoted links extending from the front posts to the lower end of the board, pivoted links extending from the rear posts to the upper end of the board, means tending to move the board pivotally, and means for limiting the upward movement of the collating board.

15. The combination with a typewriter, of a collating board, posts on the typewriter located to the front and at the rear of the board, pivoted links extending from the front posts to the lower end of the board, pivoted links extending from the rear posts to the upper end of the board, means tending to move the board pivotally, and means engageable with the upper links for limiting the movement of the collating board.

16. The combination with a typewriter, of a collating board, posts on the typewriter located to the front and at the rear of the board, pivoted links extending from the front posts to the lower end of the board, pivoted links extending from the rear posts to the upper end of the board, means tending to move the board pivotally, and adjustable means engageable with the upper links for limiting the movement of the collating board.

17. The combination with a typewriter, of a collating board, means for supporting the board for upward and pivotal movements, and adjustable means tending to move the board upwardly.

18. The combination with a typewriter, of a collating board, means for supporting the board for upward and pivotal movements, and springs tending to move the board upwardly.

19. The combination with a typewriter, of a collating board, means for supporting the board for upward and pivotal movements, springs tending to move the board upwardly, and means for varying the tension of said springs.

20. The combination with a collating board and a rotary platen associated therewith, of arms extending over said board and down over the front of the platen, and means on the board for supporting the arms, said arms having feed-rollers thereon arranged to bear on the front of the platen above the printing position thereon.

21. The combination with a typewriter carriage having a rotary platen thereon, of a collating board supported on the carriage, a paper shelf extending around the platen and to the rear of the board, a rod on the carriage to support the shelf, links extending from the board to support the shelf in the rear of the board, means on the shelf to permit the latter to slide on the rod, and means on the board for moving the paper shelf to permit the end of the same to project beyond the surface line of the board.

22. The combination with a typewriter, of a collating board, a movable paper shelf extending around the platen and having feed-rollers bearing thereagainst, links pivoted on the collating board frame and connected to the shelf for controlling the latter, and resilient means mounted on the pivot rod of the links and connected to the links at a point beyond the pivot for maintaining the rollers normally in contact with the platen.

23. The combination with a typewriter, of a collating board, a movable paper shelf extending around the platen and having feed-rollers bearing thereagainst, links pivoted on the collating board frame and connected to the shelf for controlling the latter, resilient means mounted on the pivot rod of the links and connected to the links at a point beyond the pivot for maintaining the rollers normally in contact with the platen, and means for varying the tension of said resilient means.

24. In a front-strike typewriting machine having printing instrumentalities, the combination of a rotary platen having a printing station in the rear of the printing instrumentalities, a collating board, and means for floating the platen upward and then forward over the printing instrumentalities, with the collating board, from the printing station to a sheet-collating station, such that the collating board is brought to the collating station in a largely upright position to present its collating surface in the field of vision from the front of the machine.

25. The combination of a typewriter-frame, a collating board thereon movable from an upwardly and rearwardly inclined collating position to a substantially vertical printing position, and guiding links pivoted on the typewriter-frame and the board to compel first a substantial horizontal backward translatory movement of the board, then a turning movement to a substantially vertical position, and then a substantially vertical drop, to bring the lower end of the board to front feeding, printing position as the board is moved from collating position to printing position.

26. The combination with a collating board and a rotary platen, of a line-gage thereon, means whereby the collating board, platen and line-gage may be shifted together between sheet-arranging and typing positions, and means for throwing the line-gage on and off the platen in sheet-arranging position to permit of insertion and adjustment therebetween of work-sheets.

27. The combination with a platen, of a frame therefor, a sheet-shelf mounted on the frame, a line-gage mounted on the sheet-shelf, a collating board, and means for moving all of said elements together between a typing position and a sheet-arranging position.

28. The combination with a rotary platen, of a collating board, devices for alining and holding sheets on the board, and supports on which said devices may have a gravity drop to the board; whereby, when said devices are lifted, the sheets may be positioned under the same on the board, and, when the devices are dropped, the weight thereof will hold the sheets to the board.

29. The combination with a rotary platen, of a line-space mechanism controlling the line-space movement thereof, a knob or other finger-piece for effecting line-space movement of the platen, a collating table, and means whereby the platen with the line-space mechanism and the finger-piece may be shifted between a typing position and a collating position.

30. The combination with a rotary platen, of a carriage therefor, a collating board, supporting attachments for the board to the carriage located in part forward and in part rearward of the carriage to distribute the weight of the board fore and aft on the carriage, linkages from the board to the supporting attachments to permit the board to be swung on said attachments between a collating position and a typing position, and pressure devices acting on said linkages to assist in the aforesaid distribution of the weight of the board.

31. The combination with a typewriter, of a collating table movable between a collating position and a typing position, an automatically acting pressure device to urge the collating table to collating position, and means for adjustably limiting the throw of the table.

32. In a typewriting machine, in combination, a platen, a collating board, a sheet-positioning gage on the collating board, and a pressure roll mounted on the gage to bear against the platen to hold a work-sheet in position thereon.

33. In a typewriting machine, in combination, a platen, a collating board, a marginal, sheet-positioning gage mounted on said board to be adjustable crosswise thereof, and a finger carried by said gage and extending to the platen to bear against the same, to hold a work-sheet in adjusted position thereon.

34. In a typewriting machine, in combination, a platen, feed-rolls adapted to co-operate therewith, means for throwing said feed-rolls onto and off the platen, a collating board, a sheet-positioning gage carried by said board, and a sheet-holding device carried by said gage to bear against the platen for holding a work-sheet at one side thereof in adjusted position on the platen while the feed-rolls are off the platen, to permit other sheets to be inserted between the feed-rolls and the platen in adjusted position with respect to the first-mentioned work-sheet while the latter is held against the platen by the device carried on the gage.

35. In a typewriting machine, in combination, a platen, a collating board, a sheet-holding gage adjustable crosswise of the collating board, a pressure-finger mounted on the gage to bear against the platen to hold a work-sheet in adjusted position thereon, and a clip on the gage for holding other sheets in adjusted position on the collating board with respect to the first-mentioned work-sheet.

36. In a typewriting machine, in combination, a platen, a collating board, a sheet-positioning gage movable from the board to permit insertion of a work-sheet thereunder, and to the board, to hold the inserted work-sheet on the board, a finger carried by the gage to hold said work-sheet in adjusted position against the platen when the gage is on the board, and means for holding another sheet to the collating board on top of the first-mentioned sheet and free of the platen-engaging finger carried by the gage.

37. In a typewriting machine, in combination, a platen, feed-rolls therefor, a collating board, means for shifting the platen with its feed-rolls and collating board from a normal typing position to a collating position, means for throwing the feed-rolls on and off the platen in collating position, a sheet-positioning gage carried by the collating board, a finger carried by the gage adapted to bear against the platen to hold a work-sheet in adjusted position thereon when the feed-rolls are thrown off the platen, to permit of the insertion between the same and the platen of other sheets in adjusted relation to the first-mentioned work-sheet.

38. In a typewriting machine, in combination, a platen, a collating board, and a sheet-clamping device protruding into the sheet field on the board and movable down to and up from the board, said clamp being substantially flat and being held substantially parallel to the board to remain between the clamped sheet and an overlying collated sheet throughout its releasing movement; whereby the under sheet may be released without the necessity of withdrawing said clamp from between the sheets or curling up the border of the upper sheet.

39. In a typewriting machine, in combination, a platen, a collating board, and a sheet-clamping device protruding into the sheet field on the board and movable down to and up from the board, said clamp being substantially flat and being held substantially parallel to the board to remain between the clamped sheet and an overlying collated sheet throughout its releasing movement; whereby the under sheet may be released without the necessity of withdrawing said clamp from between the sheets or curling up the border of the upper sheet, said clamping device comprising a gage for the edge of an overlying work-sheet.

40. In a typewriting machine in combination, a platen, a collating board, and a plurality of sheet-clamping devices protruding into the sheet field on the board and independently movable down toward and up from the board, each of said clamps being substantially flat and being held substantially parallel to the board to remain between the clamped sheet and an overlying collated sheet throughout its releasing movement; whereby a clamped sheet may be released by either clamp without withdrawing the clamp from between the sheets or curling up the border of the upper sheet.

41. In a typewriting machine, in combination, a platen, a collating board, a plurality of sheet-clamping devices protruding into the sheet field on the board and independently movable down toward and up from the board, each of said clamps being substantially flat and being held substantially parallel to the board to remain between the clamped sheet and an overlying collated sheet throughout its releasing movement; whereby a clamped sheet may be released by either clamp without withdrawing the clamp from between the sheets or curling up the border of the upper sheet, and means for adjusting the position of one of said clamps crosswise of the board.

42. In a typewriting machine, in combination, a platen, a collating board, and a plurality of flat sheet-clamping devices protruding over the sheet field on the board, parallel thereto in both their released and effective positions, and movable down to and up from the board between the released and effective positions.

43. In a typewriting machine, in combination, a platen, a collating board, and a plurality of flat sheet-clamping devices protruding over the sheet field on the board, parallel thereto in both their released and effective positions, and movable down to and up from the board between the released and effective positions, each of said clamping devices comprising a gage for the edge of an overlying work-sheet.

44. In a front-strike typewriting machine having printing instrumentalities, the combination of a rotary platen in the rear of the printing instrumentalities, means for elevating the platen over the printing instrumentalities from typing position to a sheet-collating position without turning the front portion of the platen from the field of vision, a paper-guiding apron moving with the platen and extending around under the platen and up to the front thereof, means moving with the platen to enable a sheet to be gaged in printing position upon the platen while the latter is in its forward position, and means also moving with the platen to secure the sheet where adjusted, whereby, after the platen is clear of the printing instrumentalities, the sheet may be inserted downwardly, bottom end first, between the platen and the front edge of the apron, and guided by the latter downwardly and rearwardly around the platen, and gaged and secured preparatory to returning the platen to printing position.

JOHN A. WHERRY.

Witnesses:
J. N. Swing,
St. Clair Adams.